(12) United States Patent
Seaton et al.

(10) Patent No.: US 10,404,775 B2
(45) Date of Patent: Sep. 3, 2019

(54) SYSTEM AND METHOD FOR COMMERCIAL AND RESIDENTIAL SYSTEMS MONITORING AND NOTIFICATION

(71) Applicants: Tim Seaton, Pittsboro, NC (US); Tommi Parkkila, Cary, NC (US)

(72) Inventors: Tim Seaton, Pittsboro, NC (US); Tommi Parkkila, Cary, NC (US)

( * ) Notice: Subject to any disclaimer, the term of this patent is extended or adjusted under 35 U.S.C. 154(b) by 381 days.

(21) Appl. No.: 15/203,113

(22) Filed: Jul. 6, 2016

(65) Prior Publication Data

US 2018/0012479 A1 Jan. 11, 2018

(51) Int. Cl.

| | |
|---|---|
| *G01M 1/38* | (2006.01) |
| *G05B 13/00* | (2006.01) |
| *G05B 15/00* | (2006.01) |
| *G05D 23/00* | (2006.01) |
| *H04L 29/08* | (2006.01) |
| *G06Q 30/06* | (2012.01) |
| *H04L 12/58* | (2006.01) |
| *F24F 11/58* | (2018.01) |
| *F24F 11/46* | (2018.01) |
| *F24F 11/39* | (2018.01) |
| *F24F 11/38* | (2018.01) |
| *H04L 12/28* | (2006.01) |
| *F24F 110/10* | (2018.01) |
| *F24F 110/50* | (2018.01) |
| *F24F 110/64* | (2018.01) |

(52) U.S. Cl.
CPC .............. *H04L 67/02* (2013.01); *F24F 11/38* (2018.01); *F24F 11/39* (2018.01); *F24F 11/46* (2018.01); *F24F 11/58* (2018.01); *G06Q 30/0633* (2013.01); *H04L 12/2823* (2013.01); *H04L 51/24* (2013.01); *H04L 51/32* (2013.01); *F24F 2110/10* (2018.01); *F24F 2110/50* (2018.01); *F24F 2110/64* (2018.01); *H04L 2012/285* (2013.01)

(58) Field of Classification Search
CPC .......... H04L 51/32; H04L 67/02; H04L 67/10
USPC ........................................................ 700/275
See application file for complete search history.

(56) References Cited

U.S. PATENT DOCUMENTS

2012/0319851 A1* 12/2012 Hoglund ................ G08B 21/18
340/607
2012/0323375 A1* 12/2012 Dean-Hendricks ... F24F 3/1603
700/276
2014/0266755 A1* 9/2014 Arensmeier ......... F24F 11/0086
340/679

(Continued)

*Primary Examiner* — Md Azad
(74) *Attorney, Agent, or Firm* — John L. Sotomayor (57) ABSTRACT

A monitoring system for apparatus and systems in commercial and residential properties is provided. The monitoring system consists of a head unit and a tail unit, each of which has one or more sensors that measure performance parameters that are important to understanding the performance of the apparatus and system being monitored. As an example, an HVAC system may be monitored to determine when an air filter needs to be changed, or to predict when failure of the HVAC system may be imminent. The sensor array in the head unit and tail unit measure performance and report alerts and historical system performance to users through a mobile app, social media accounts, or any other system for communicating over a wired or wireless network connection.

13 Claims, 4 Drawing Sheets

(56) References Cited

U.S. PATENT DOCUMENTS

2015/0300892 A1* 10/2015 Malhotra ............... G01K 13/00 700/276
2016/0328945 A1* 11/2016 Greisser .................. F24F 11/30

* cited by examiner

SYSTEM AND METHOD FOR COMMERCIAL AND RESIDENTIAL SYSTEMS MONITORING AND NOTIFICATION

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Heating, ventilation, and air conditioning (HVAC) are systems that are used in both commercial and residential buildings intended to control and monitor the environmental comfort levels within the building. An air filter is one of the most important components of the system, cleaning the air that passes through the filter material. HVAC manufacturers calculated system performance based on ideal air flow with a reference filter. When different filters are used by the homeowner, and/or as filters capture particulate from the air stream, the optimum system performance is compromised. This reduced efficiency places stress on HVAC system components and increases the amount of energy required to heat or cool the home. Typically monitoring systems for residential and commercial HVAC purposes do not measure air filter condition and depend upon a user to replace the air filter on a regular basis. More recent developments provide for limited monitoring of air filter condition. Additionally, the conventional use of HVAC monitoring systems has begun to allow for a signaling response to an internal unit within the home or a singular remote device worn by the user when the replacement time period has been exceeded.

Manufacturers have attempted to develop devices to proactively monitor the pressure difference for a single medium such as pressure or temperature. This has been a means of determining when a filter would need to be changed. In addition to monitoring HVAC conditions, the extent of previous devices have used such accessories as wearable wrist bands which operate in conjunction with a Bluetooth port or other wireless communication. Conventional devices have succeeded at determining when to change a filter under designated conditions such as specifically when pressure readings reach a certain threshold value.

BRIEF DESCRIPTION OF THE DRAWINGS

Certain illustrative embodiments exemplifying the organization and method of operation, together with objects and advantages, may be best understood by reference to the detailed description that follows, taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to "mobile device" refers to any handheld device such as, but not limited to, a smart phone, tablet, iPad, network computer, watch or any other device a user may employ to interact with one or more networks.

Reference throughout this document to HVAC refers to a Heating, Ventilating, and Air Conditioning system installed in residential or commercial properties.

In an embodiment, the proposed invention as outlined allows for greater monitoring by using a wide range of measuring components which allows for increased monitoring over various systems and environmental conditions not limited to HVAC. This increased monitoring system includes commercial and residential which encompasses additional systems besides the traditional HVAC monitoring. The proposed inventive idea interfaces with a plurality of software services, such as cloud-based services and other software-as-a-service systems, while utilizing technology available on mobile devices, such as iOS and Android devices, in a way which has not been provided previously. Using a broader array of sensors to detect various conditions that indicate both filter and system health provides an advantage to the proposed invention.

In an embodiment, the apparatus for residential and commercial system monitoring may have a system or application specific measurement element, an element that provides wireless communication with outside connections and interaction with a user through visual displays, and a primary processor containing the operational software for command and control of the residential and commercial monitoring system. The monitoring system provides a platform to enter all building related maintenance events, whether commercial or residential, and provides the ability to collect and analyze measurement information to assist in building maintenance. The user of the monitoring system may input classifications for different types of maintenance activities, such as repair and replacement requirements, system configuration parameters, and specific goals the user wants to achieve by using the system. Based on the user inputs, the system may provide suggestions and recommendations to the user, based upon collected measurement data, to generate energy and equipment cost savings. The monitoring system may achieve these goals by notifying users to perform system maintenance when it is scheduled, needed or necessary, based upon operational information collected about the device or apparatus to which the monitoring system is attached. Additional system conditions for equipment that is not directly connected to monitoring system may also be detected based upon acoustic and other measurement data collected by sensors that permit data collection about ambient conditions in the environment in which the system sensors are installed. This information may include information about the condition of the hardware components, operation of the device or apparatus being monitored, and information about system components that may be inferred from data collected about ambient conditions during operation of the HVAC equipment.

In an embodiment, the application specific measurement element of the monitoring system, a "tail", may have one or more sensors adapted to record measurements on a schedule and transfer those measurements to the primary processor. In this embodiment the tail is mounted to the device or the device housing for which measurements are to be performed and collected. The tail is in physical and data connection with a standard universal portion of the apparatus that provides for wireless communication and visual interactions with a user, this standard universal portion of the apparatus is the "head" end of the apparatus. The tail is connected to the head through an interface portion which is defined as the "neck" portion of the apparatus.

In this embodiment the tail is an application specific measurement apparatus for the monitoring system. The tail contains one or more sensors that are specific to the device to be monitored and is configured to perform specific measurements and monitoring. The tail transmits the collected measurements and monitoring information to the head through the interface neck portion of the apparatus. The measurements and monitoring information may then be provided to a user either through a visual display of the information on a screen display, or the measurements and monitoring information may be transmitted wirelessly to another location or to one or more mobile devices, such as a smart phone, tablet, network computer, network server, cloud-based storage, outside storage, or any other location from which a user may recall and review the measurements and monitoring information at a later time. In a case in which there is no communication media or channel available for the head to transmit measurement data, the data may be stored in the head portion for future data transmission. The head may also be configured to perform analysis on the measurement and monitoring information transmitted from the tail and includes the results of the analysis reported to the user, transmitting to another processor, and collected in the cloud-based or other storage device.

In a non-limiting example, one or more tail sensors could be configured to monitor an air filter portion of a heating and air conditioning unit to determine when an air filter is not operating properly or when the air filter within the unit needs to be changed for a new air filter. In a non-limiting example, in conjunction with the head part sensors, the tail sensor apparatus may capture measurements continuously to determine the level of clogging and amount of particulate matter, the level of "dirtiness", in the air filter of an HVAC system installed in a commercial or residential property. As the measurements exceed a pre-set threshold level, the monitoring system may notify one or more users when the air filter should be changed. In an additional exemplary embodiment, the measurements may provide a diagnosis of not only the "dirtiness" of the air filter within the HVAC system, but also provide a measurement of the health of the HVAC system as a whole. The monitoring system may capture all sensor measurements and log efficiency profile data of the HVAC system, report on the condition of the HVAC system, and provide a predictive prognosis of a future condition profile.

In this example, the tail sensor apparatus may be mounted such that the sensor end is inside the duct and the other end is mounted in a room side of the air filter grille. In this non-limiting example, the portion of the tail sensor apparatus that is connected to the head portion is the neck connection portion. The head portion of the assembly may be positioned inside the duct between the room side of the air filter and the inside surface of the grille frame and mounted on the neck through a physical connection, where such a physical connection may be a magnetic, adhesive, or any other means for physical attachment to the HVAC duct component. This physical connection permits the joining of the head portion of the assembly to the neck portion of the assembly. Each neck portion is associated with a tail portion of the assembly. Connecting the head portion to the tail portion through the neck portion establishes both physical and data communication connections through the neck portion. The tail portion of the assembly provides specific sensors and measurement apparatus to measure and capture data about the performance of the air filter in the heating and air conditioning unit. The air filter monitoring tail sensor portion may be equipped with a pressure sensor, a temperature sensor, and a microphone.

In an alternative embodiment, the head, neck, and tail portions of the apparatus are functional portions that may be integrated within a single unit. The single unit may consist of an integrated design in which the functional portions provide separate functionality but are contained within a single exterior housing.

However, this is not the only tail sensor portion that may be created. In a non-limiting example, the tail sensor portion may be a more permanent installation, and configured to its location. In additional exemplary embodiments the tail sensor portion could be configured to sense vibration or other phenomena, so as to detect vibration signal anomalies in the object to which it is attached such as a furnace or furnace blower. Other exemplary tail sensor portions could be configured to measure and report electricity consumption or to measure water consumption. Additional tail sensor portions may be configured to measure and collect data about other systems as well.

In this exemplary embodiment, the head portion may be equipped with sensors such as pressure sensors, light sensors to detect ambient light, temperature sensors, humidity sensors, capacitive proximity sensor utilized for human-machine interface interactions or presence/motion sensing, sensors to gauge overall air quality, and a battery. The head portion may be equipped with a broad range of sensors permitting the head portion to connect to, and interact with a wide number of tail portions through adaptive neck interface portions. The head portion and tail portion work together to perform measurements and collect data necessary to analyze the apparatus, equipment, or portion of a system for which the monitoring system has been installed.

In a non-limiting example, where the system to be monitored is the air filter associated with a heating and air-conditioning system, the tail portion is attached to the air filter housing with the tail portion extending through the body of the air filter, and configured to measure the parameters important to the performance of the air filter. With the tail and head portions in an air filter monitoring configuration, the primary monitoring measurement is a pressure differential, the delta-pressure, from one side of the air filter to the other side. A first pressure sensor measures the air pressure in a room space. This first pressure sensor is a part of the head portion of the Heating, Ventilation, and Air Conditioning (HVAC) monitoring assembly. A second pressure sensor measures the air pressure inside the duct work of the HVAC system. The second pressure sensor is a part of the tail portion of the air filter measurement assembly.

When in operation, the fan of a furnace will push or pull air through a filter, causing a pressure drop across the air filter. The system will collect measurements from the first air pressure sensor in the head portion and the second air pressure sensor in the tail portion of the HVAC monitoring system. When the air filter is new it is clean of particulate matter that may interfere with the function of the air filter. The HVAC monitoring system may have the pressure differential measurement collected when the air filter is newly installed, and presumably clean, and retains this pressure differential measurement as the baseline value. As the air filter begins to accrete particulate matter by removing this particulate matter from the air as it passes through the air filter, the particulate matter causes interference with the air flow through the air filter. As this interference due to the accretion of particulate matter increases, as the air filter becomes dirtier, the pressure differential measurement increases in relation to the baseline measurement. The more accumulated particulate matter, the dirtier the air filter has become, the greater the clogging of the filter material and the larger the pressure variation is in relation to the baseline pressure differential measurement.

In an exemplary embodiment, in modern HVAC systems air blowers may run at various speeds. Because of this variation in blower speed, the pressure differential may not be an absolute indication of how dirty an air filter has become because a greater fan speed causes a larger pressure difference, and a lower fan speed causes a smaller pressure difference in an air filter having the same air flow specifications. For this reason, a secondary sensor measurement is collected as a verification of the air filter pressure differential measurement previously collected. In a non-limiting example, the secondary sensor may be a microphone, with the microphone capturing a measurement of the sound level as the heating and air conditioning system is in operation. The sound measurement captured by the microphone provides the volume of the sound in decibels, but also captures a frequency signature of the sound simultaneously. The frequency signature of the captured sound is subjected to a sophisticated signal analysis in a frequency domain to determine the frequency characteristic of the captured sound measurement. The frequency characteristics of the sound measurement are then used to calibrate, or normalize, the change in the pressure measurement to a correct scale. In this non-limiting example, the air pressure differential measurement in combination with an analysis of the sound measurement as the heating and air conditioning system is in operation presents a more accurate determination of the state of the cleanliness of the air filter currently installed in the heating and air conditioning system. Additionally, a series of captured combination measurements from the microphone and the air pressure sensors provides an accurate description of the usage duty-cycle of the heating and air conditioning system to which the monitoring system is attached. The recorded sensor data may, over time, permit the monitoring system to identify anomalies in the operating duty-cycle of the heating and air conditioning system and report any such anomalies, which may include an indication of imminent heating or cooling efficiency changes and equipment failures, to the user or owner of the system.

The monitoring system may report sensor measurements, raw data views, formatted data views, analysis of system operation, and indications of anomalous operation, alerts, or any other data from the sensors, analysis module, or reporting module. The data, alerts, and other information, including, where setup by a user, customized data views, may be communicated to a user through a wired or wireless communication channel. The wired signal may be a connection to a computer system between the monitoring system and a laptop, networked or other computer system. The monitoring system may also connect through a wireless network connection to a cloud-based storage capability where measurement and analysis data may be retained and viewed by a user through a web browser on a computer system. In an alternative embodiment, the monitoring system may connect directly to a mobile device and or application through a wireless connection to a wireless server. The monitoring system may connect through a wireless network, network connected browser, or mobile application to a cloud-based storage capability where measurement and analysis data may be retained and viewed by a user through a web browser or through a mobile application installed on a mobile device.

The mobile application may be installed on a mobile phone, iPad, tablet, network computer, or any other handheld device that is configured for use with mobile applications. The monitoring system may have a mobile application that is installed on the mobile device and permit a user to view any of the data, alerts, and analysis information, and also be configured to permit command and control communications from the user to be sent to the monitoring system. Such command and control communications may permit the user to interact with the system to change parameters, collect additional information, start or stop the system, or perform any other user directed operations as directed by the user.

In additional exemplary embodiments, the monitoring system may also provide HVAC usage statistics, estimated energy costs based upon the measured usage of the HVAC system, and provide suggestions for different control options to one or more users to optimize the HVAC system usage. The sensor measurements may be used to create a timeline for the usage of the HVAC system to provide the one or more users with a view of energy consumption over time. A user may enter executed maintenance events on the timeline, plan and schedule maintenance projects and place these scheduled projects on the timeline so that the monitoring system may issue notifications as the scheduled projects come due. All of the information from the monitoring system, as will be disclosed in further detail below, may communicate with the one or more users through either wired or wireless networked data channels to provide sensor measurements, timeline information, notifications, alerts, or any other data regarding system performance or usage requested from the monitoring system by the user. Additionally, the monitoring system may be configured to provide condition-based advertisements to the one or more users and transmit these advertisements along with any other system or monitoring data to be received by the one or more users.

Figure 1:
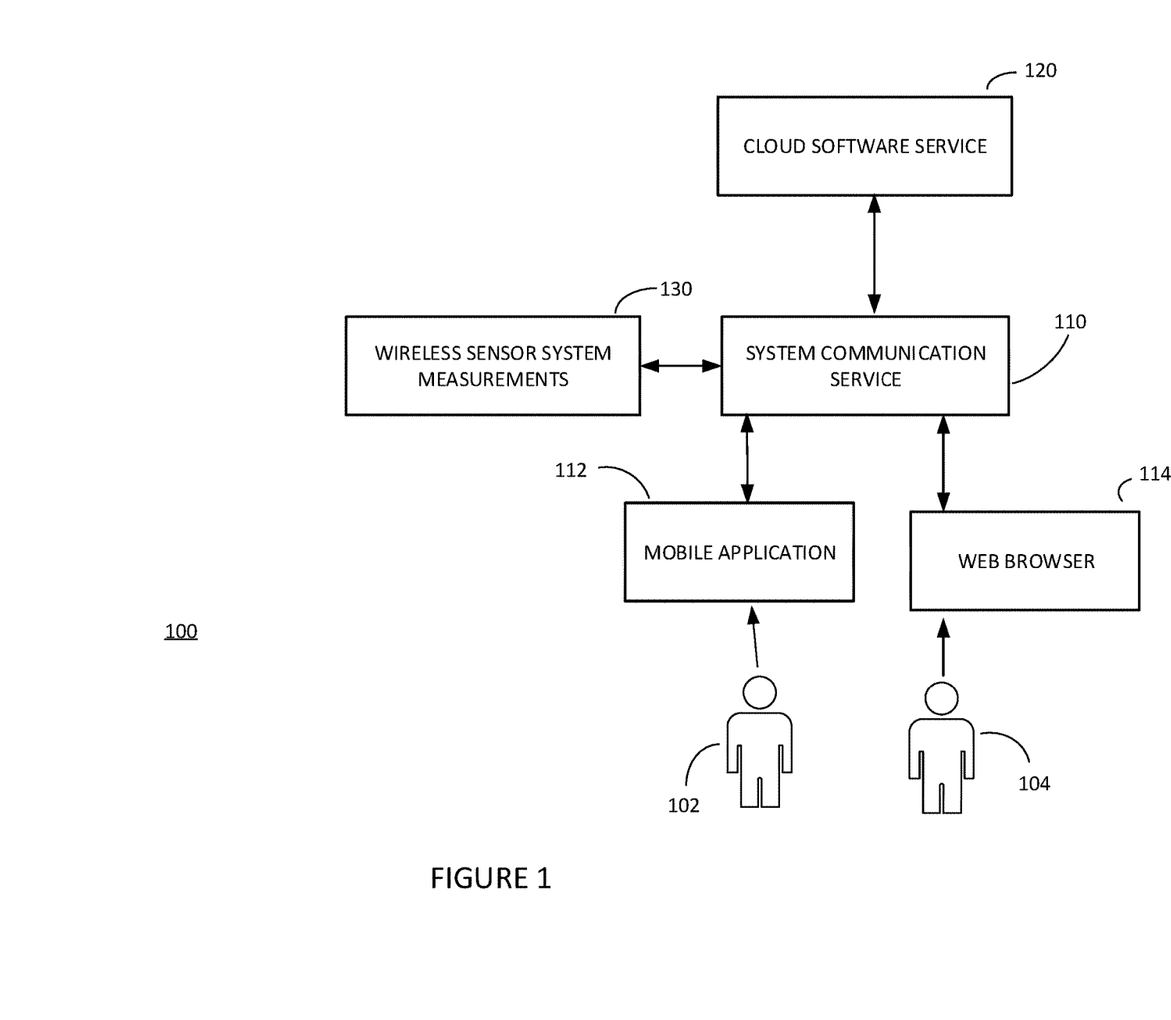
FIG. 1 is a view of a view of the data communication configuration of the monitoring system consistent with certain embodiments of the present invention.

Turning now to FIG. 1, forming part of the disclosure herein, this figure presents a view of the data communication configuration of the monitoring system consistent with certain embodiments of the present invention. In an exemplary embodiment, the drawing exhibits the interaction between the user and the various portions of the monitoring system 100. In an exemplary embodiment, one or more users (102, 104) may interact with the cloud software service 120. Users (102, 104) may interact with the cloud software service 120 through a web browser 114 that is operative on a computer system or mobile device having a wireless data connection with the cloud software service 120. One or more users (102, 104) may also interact with the cloud software service 120 through a mobile application 112 and the system communication service 110. The user interaction through a web browser 114 or mobile application 112 may permit the recall and review of data collected by the monitoring system 100 and stored within the cloud software service 120. Users (102, 104) may then take action on any alerts that are presented, may start or stop the system, or perform any other action available from the system communication service 110.

In this exemplary embodiment, the components of the wireless sensor system 130 provide a continuous monitoring process for the end user. As illustrated, the components provide a system to allow the users to optimize the maintenance of systems that use air filters as well as minimizing the cost and downtime for replacing one or more air filters by providing notification for when service or replacement is needed and analytics relating to the air filter performance within the system. The wireless sensor system structure 130, providing information and analysis to a user concerning the operation of the hardware components, allows consistent monitoring of various environmental conditions and relays data to the cloud software system via the mobile application 112 and the system communication service 110, or directly through the system communication service 110. The wireless sensor system 130 may indicate a visual status to one or more users (102, 104) locally via one or more LED indicator lights or other display means such as, in non-limiting examples, OLED, e-ink indicators, or any other indicator device or solution.

Figure 2:
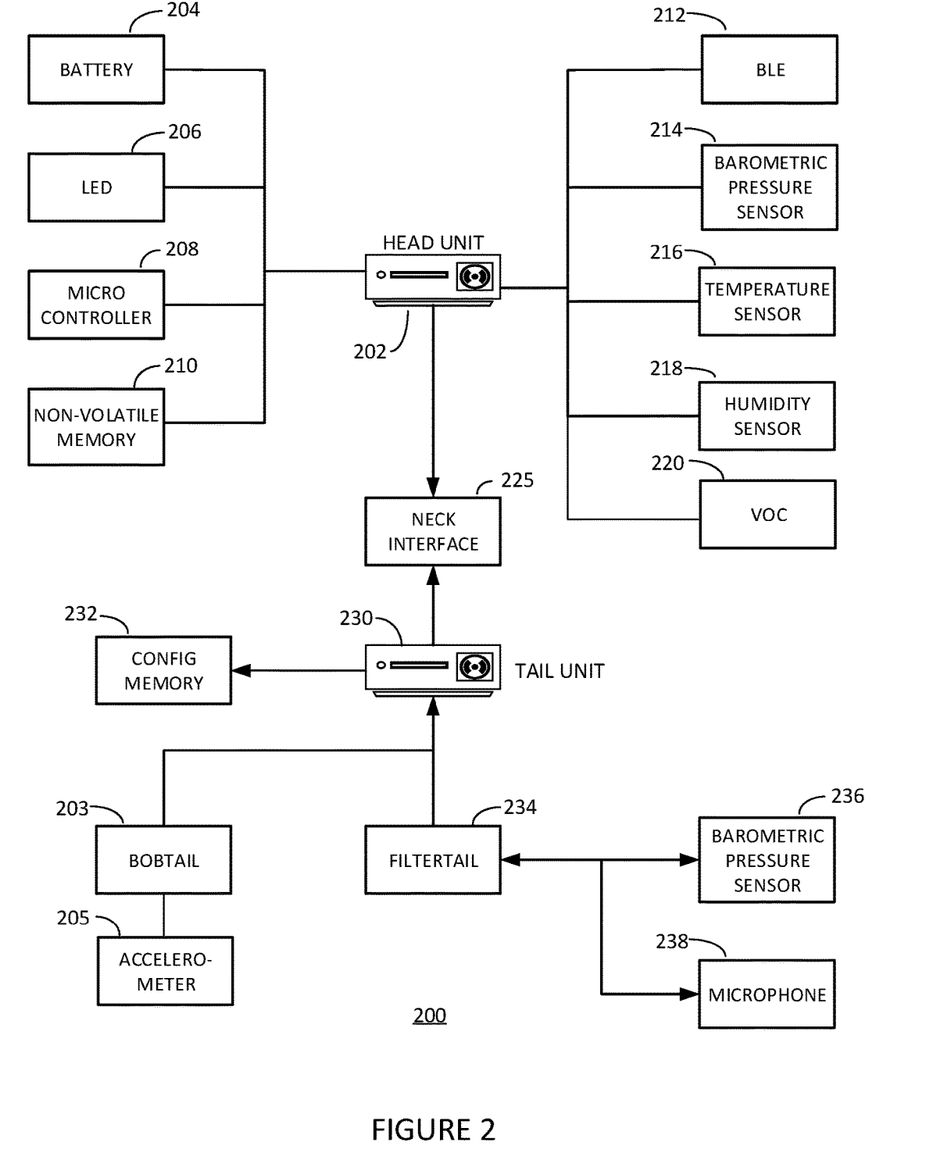
FIG. 2 is a block diagram of an embodiment of the HVAC monitoring system consistent with certain embodiments of the present invention.

Turning now to FIG. 2, this figure presents a block diagram of an embodiment of the HVAC monitoring system consistent with certain embodiments of the present invention. In an embodiment, an HVAC monitoring system 200 may be composed of a number of components that operate together to measure and monitor a designated system, such as, in this embodiment, an HVAC system. The HVAC monitoring system 200 may have a head unit 202 that comprises, by way of example and is not limited to, accessory devices such as a battery 204, a Light Emitting Diode (LED) indicator 206, one or more micro-controllers 208, and a non-volatile memory element 210. The non-volatile memory 210 may comprise one or more logical and/or physical data storage systems for storing data and applications used by the user interface (not shown) and may be compatible with the cloud software service. The head unit 202 may be configured to provide wireless connection and data communication with transceivers attached to systems external to the HVAC monitoring system 200 through a near field communication or short-range wireless solution, such as, in non-limiting examples, Bluetooth or Bluetooth Low Energy (BLE) transceivers 212. Furthermore, due to cost efficiency capabilities for near field communication or short-range wireless solutions, they may be used as intermediate gateways to the system management software and other mobile devices.

The head unit 202 is installed on the room side of the air filter grille and may also be configured with one or more sensors for capturing and saving to the internal non-volatile memory 210 measurements from the one or more sensors. Sensors that may be attached to the head unit 202 may include, but are not limited to, a barometric pressure sensor 214, a temperature sensor 216, humidity sensor 218, and VOC (Volatile Organic Compound) gas sensor 220. The particular configuration of the sensors installed with the head unit 202 may be updated or modified to capture a range of sensor measurements that are of use to a particular system to be monitored. In this non-limiting example, the sensor suite is particularly suited for capturing measurement data from an HVAC System, and in particular for measuring the operation duty-cycle and whether the air filter installed in the HVAC system should be replaced.

In this non-limiting embodiment, the microcontroller 208 contains one or more software modules that direct the measurement and data capture actions of the sensors, storing the captured data in the non-volatile memory 210. All of the data measured and captured by the sensors associated with the HVAC monitoring system 200 is initially stored within the non-volatile memory 210 installed in the head unit. The data stored within the non-volatile memory 210 may be exported to an external device through an established data communication channel initiated and maintained by the BLE transceiver 212. The battery 204 is operative to provide power for the operation of the head unit 202 and the indicator display means 206 provides a positive indication of system on/off status. When in operation, the barometric pressure sensor 214 is operative to capture pressure measurements on the side of the filter outside of the duct work to which the HVAC system is attached. The temperature sensor 216 captures and stores the temperature and the humidity sensor 218 captures and stores the humidity on an ongoing basis, with the time between samples pre-configured prior to activating the head unit 202.

In this non-limiting embodiment, the head unit 202 is connected to a neck interface 225 unit through a magnetic or other physical attachment and an electronic connector required to interface the conductors within the neck 225 and tail portions 230. The neck interface 225 is also physically connected to a tail unit 230. The neck interface 225 is installed in the room side of the air filter grille of the HVAC system. The interconnection between the head unit 202 and tail unit 230 permits the transfer of captured data measurements from the tail unit 230 to the head unit 202. The captured data measurements from the tail unit 230 may be used to perform analysis and diagnostic calculations when combined with the data captured by the sensors associated with the head unit 202.

In this exemplary embodiment, the tail unit 230 is permanently installed, and is designed for ease of installation. The tail unit 230 may also be designed to be removable. The tail unit 230 may contain a configuration memory 232 which contains the configuration information required to initiate the tail unit operation and perform the required sensor measurements and data capture, as well as the communication operations to transmit data to the head unit 202. The tail unit 230 can have various types of particular incarnations. In this non-limiting embodiment, two types of tail units are presented; a bobtail unit 203 and a filtertail unit 234. In this non-limiting embodiment, a bobtail component 203 may have an accelerometer 205 installed within the bobtail component 203. The accelerometer 205 is active to detect and measure mechanical vibration caused by rotating or structural portions of an HVAC system.

In this exemplary HVAC monitoring application, the tail unit 230 is configured as the filtertail 234. The filtertail 234 is installed within a duct on the duct side of the air filter grille. The filtertail 234 may connect to a barometric pressure sensor 236 and a microphone 238. The barometric pressure sensor 236 and microphone 238 are installed with the filtertail 234 on the duct side of the air filter grille and are operative to collect pressure measurements and sound and sound level measurements within the duct during operation of the HVAC system.

In this non-limiting embodiment, the air filter monitoring configuration is primarily measured by using a pressure difference, i.e. delta-pressure, from the room side to the duct side of an air filter. The barometric pressure sensor associated with the head unit 202 measures air pressure in a room space, and the barometric pressure sensor associated with the filtertail 234 type of the tail unit 230 measures the air pressure in the ductwork. When a fan of a furnace induces air through an air filter, it causes pressure to drop across the air filter. The more particulate matter trapped within the air filter, the "dirtier" and more clogged the air filter becomes, and the larger the pressure differential in the measurements between the room side and the duct side of the air filter. As a result of the challenges associated with measuring such conditions often a larger value for pressure differences can occur due to the fan speed, the monitoring system introduces a secondary measurement as a verification of the pressure differential measurements. This secondary measurement is a sound microphone 238 to monitor the operation of the furnace through ambient audio levels. The microphone 238 will also permit the monitoring system to analyze frequency domains to provide for a more accurate measurement for calibration or to normalize the delta-pressure measurement to a more efficient level. This secondary sound measurement is also used to determine usage duty-cycle of a furnace and to identify abnormalities during the operation of the furnace which may indicate future HVAC system malfunction or failure. This information could be configured to be recorded and wirelessly communicated by the head unit 202 to an exterior display unit, computer, mobile application, or other system to present this information to a user.

Figure 3:
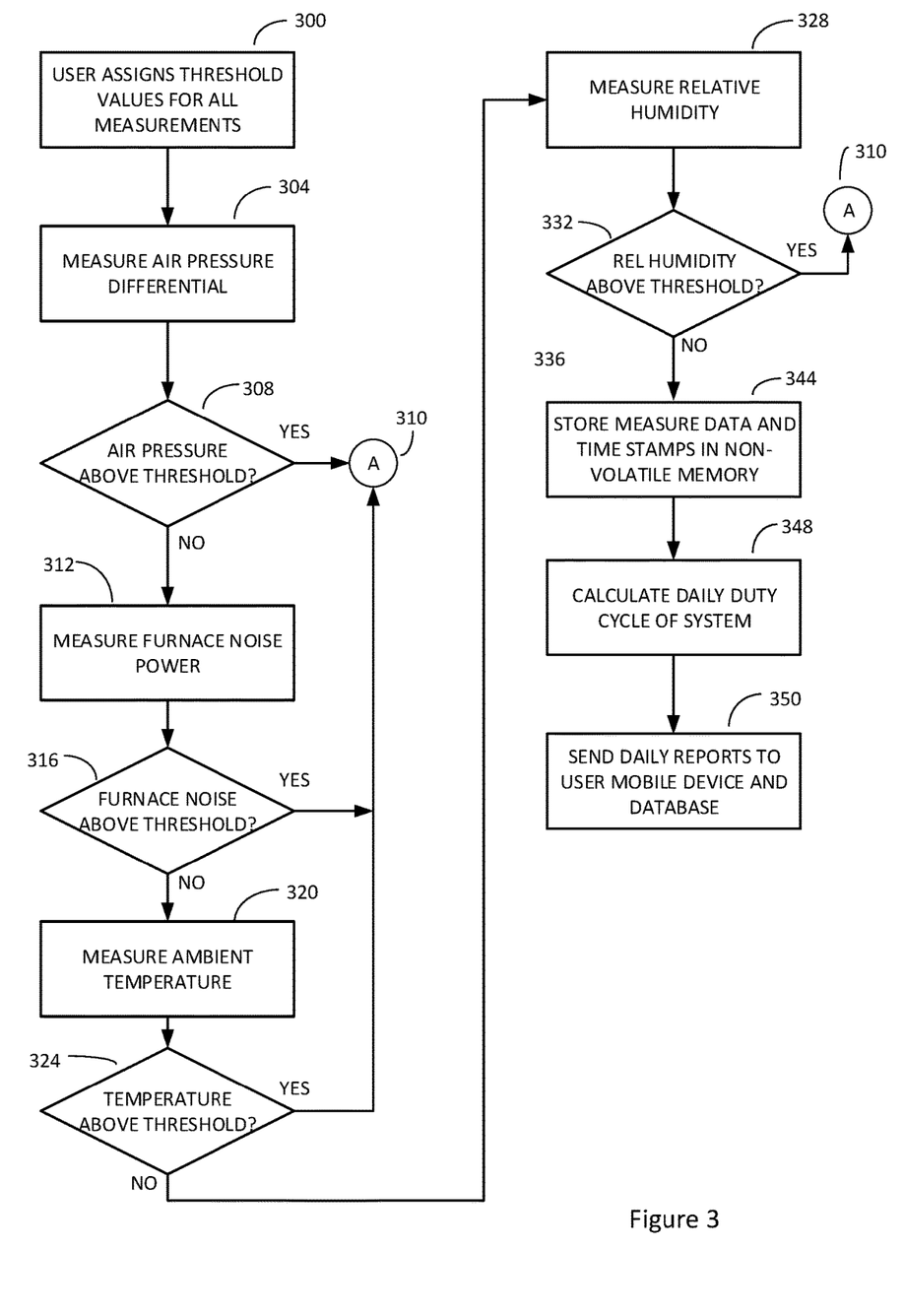
FIG. 3 is a flow chart of an exemplary method of monitoring an air filter operation and condition consistent with certain embodiments of the present invention.

Turning now to FIG. 3, this figure is a flow chart of an exemplary method of monitoring an air filter operation and condition consistent with certain embodiments of the invention. In an embodiment, a clean air filter may be installed in the HVAC system and used to determine and set a filter change threshold value. In this manner, the system records system performance and learns the threshold values for all measurements that are to be collected from the HVAC system that are associated with the air filter condition and performance 300. The operational method may be implemented in one or more processing devices, such as a vibration device, electricity meter, water meter, pressure sensor, light sensor, humidity sensor, and capacity proximity sensor. The one or more processing devices may include one or more devices executing some or all of the operations of method 300 in response to instructions stored by the user.

In a non-limiting example, the monitoring system is installed by attaching the head unit, neck unit, and tail unit to the HVAC system, with the head unit on the room side of the air filter, and the tail unit on the duct side of the air filter, with the neck unit forming the data communication and physical connection between the head unit and the tail unit. With the components of the monitoring system attached to the HVAC system, the monitoring is active to collect and store measurements of the air pressure differential between the room side and the duct side of the air filter 304.

In this non-limiting example, the collected air pressure differential between the room side and duct side of the air filter are compared against a pre-configured or assigned threshold value for the desired air pressure differential value 308. If the air pressure differential value is greater than the user assigned threshold value, an alert may be generated by the monitoring system, logged in non-volatile memory, and transmitted to the user 310. If the air pressure differential value is lower than the pre-configured or assigned threshold value, the measured pressure differential value is stored in the non-volatile memory, and the monitoring system proceeds to collect and compare additional system performance values to verify the air pressure differential measurement and monitor additional parameters of HVAC system performance.

In this non-limiting example, the monitoring system is operative to measure the sound level and frequency characteristics of the noise produced by the furnace or blower of the HVAC system during operation 312. The amount of noise produced by the HVAC system during operation may be indicative of the system being overburdened. Alternatively, the frequency characteristics of the sound produced by the HVAC system during operation may indicate imbalance or instability in the HVAC system that is predictive of future failure. The monitoring system compares the sound level and frequency characteristics against the stored parameters for the sound measurements input by the user 316 or set by other method. If the noise level or frequency characteristics are outside the threshold values pre-assigned or pre-set for the system, an alert may be logged with the system and transmitted to the user 310.

In this non-limiting example, the monitoring system is operative to measure the ambient temperature in the room in which the head unit is installed 320. Once again, the monitoring system is operative to compare the collected sensor measurement, in this instance the room temperature, against the pre-assigned or pre-set input value 324. If the value is outside the pre-assigned or pre-set input value, an alert may be generated by the monitoring system, logged in non-volatile memory, and transmitted to the user 310.

In this non-limiting example, the monitoring system may also measure the relative humidity in the room in which the head unit is installed 328. Once again, the monitoring system is operative to compare the collected sensor measurement, in this instance the relative humidity, against a pre-assigned or pre-set input value 332. If the value is outside the pre-assigned or pre-set input value, an alert may be generated by the monitoring system, logged in non-volatile memory, and transmitted to the user 310.

In this exemplary embodiment, all collected data measurements, alerts, and communication between the user and the monitoring system are time stamped. The time stamped data is stored in the non-volatile memory 344. The collected measurement data, timing, threshold settings, and all other HVAC system parameters may then be utilized to calculate a daily duty cycle of the HVAC system 348. The calculated daily duty cycle information is also stored in the non-volatile system memory, and may also be transmitted to a cloud-based storage system along with all collected data measurements, timing data, and all system parameters. The monitoring system may then send one or more daily reports to a user computing device, a user mobile device, and/or the cloud-based data storage system 350.

Figure 4:
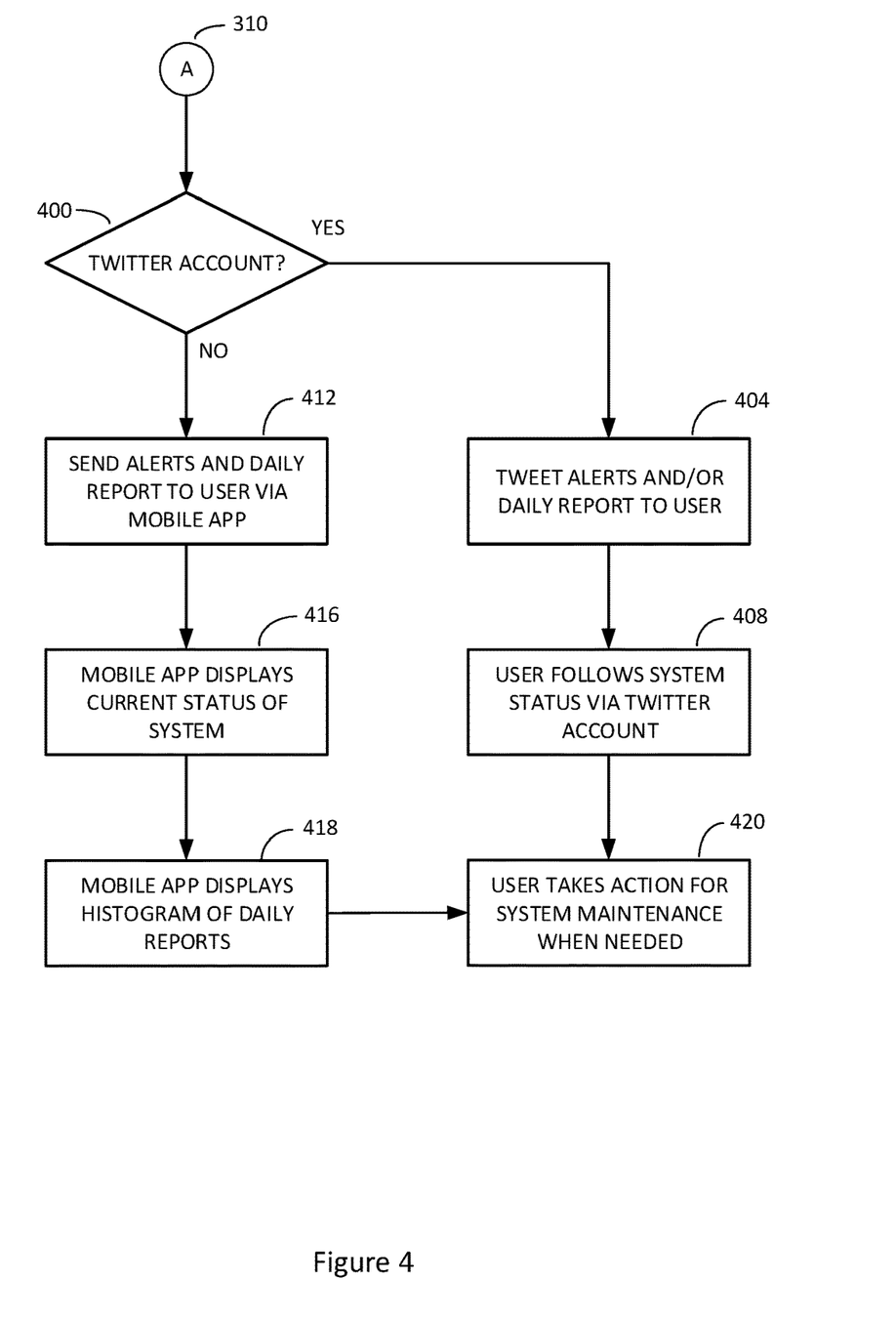
FIG. 4 is a flow chart of an exemplary method of sending alerts from the monitoring system to one or more users consistent with certain embodiments of the present invention.

Turning now to FIG. 4, this figure is a flow chart of an exemplary method of sending alerts from the monitoring system to one or more users consistent with embodiments of the invention. In a non-limiting embodiment, the monitoring system may generate and transmit one or more alerts 310 to users registered with the monitoring system. The users registered with the monitoring system may include the property owner, property manager, resident, service technician, or maintenance service provider. Registered users may elect to receive any or all alerts and may then respond to the alerts as required.

In a non-limiting example, alerts may be transmitted to any registered user that maintains an account on one or more social media sites. The monitoring system may check to determine whether the registered user has one or more social media accounts 400. In this non-limiting example, once the monitoring system has determined that a user has a social media account, that messaging with the particular social media account is supported by the system, and that the user has authorized the monitoring system to communicate via this account, the monitoring system may send alerts, daily reports, and any other system information that the monitoring system has been configured to communicate to the user 404. The user may then take action to follow the system status communicated to the user from the monitoring system through one or more messages transmitted to a mobile or other network connected device associated with the user 408.

If the monitoring system determines that the user is not configured to receive alerts or other communications through a supported social media account, the monitoring system may select a different channel of communication to interact with one or more registered users. A registered user may be configured to receive communications from the monitoring system through the use of email, text, SMS messages to a mobile application or through messages sent to a web page established for displaying monitoring system communications. The monitoring system may then send alerts, daily reports and any other system information the monitoring system has been configured to communicate to one or more registered users by transmitting such information, in a non-limiting example, to a mobile application installed on the registered user's mobile device 412. The mobile application or network connected browser may be configured to display the current status of the system, as well as any alerts or other data communications transmitted from the monitoring system regarding the system performance 416. The mobile application or network connected browser may be configured to display a histogram of daily reports to permit a registered user to review the performance of the apparatus to which the monitoring system is connected over time 418.

In a non-limiting embodiment, whether a registered user receives data communicated from the monitoring system through one or more supported social media accounts, mobile application, or any other communication pathway, the user is informed about the performance of the apparatus being monitored and may take action to perform system maintenance when needed 420, and may take action to maintain the apparatus before a catastrophic failure occurs. In this manner, the user has the information necessary to make decisions that keep the monitored apparatus operating at optimum performance and to plan outages for maintenance of the apparatus at the convenience of the user.

In an additional exemplary embodiment, the monitoring system may be configured to either directly contact a service provider when certain conditions have been met or to display a notification to a user asking if the user wants a selected service provider to perform pre-identified condition related services. In a non-limiting example, pre-identified condition related services may be associated with maintenance schedules, or with defined replacement or repair conditions, or with the automated reordering of consumables, or with contacting a third-party service provider for service. Each of these pre-identified condition related services may be set as trigger events for the monitoring system, such that when the trigger event is detected by the one or more sensors reporting to the monitoring system, the condition related service may be initiated by the monitoring system so as to update, reorder, repair, or otherwise manage the monitoring system response to the condition trigger. Utilizing sensors to detect pre-identified conditions such that condition related services may be triggered permits the monitoring system to maintain the HVAC or other system to which the monitoring system is attached in peak operating condition.

In an additional exemplary embodiment, condition-based advertisements may be triggered by conditions detected through the sensors attached to the monitoring system. In a non-limiting example, a service provider could purchase ads associated with trigger events. In this example, when the trigger event is detected ads could be delivered to the display or mobile device associated with the monitoring system. In a non-limiting example, a condition that triggers the delivery of an ad may be "if the system detects a clogged filter and the user has opted-in for condition-based ads and service provider has personnel within XX minutes of the domicile of the user then push a tailored advertisement to the user," where XX is a number that may be pre-configured for the system. Additional ads may be triggered by other conditions and business rules that are pre-configured within the monitoring system.

In an additional exemplary embodiment, automated ordering of consumable items, such as air filters, may be triggered by conditions detected through the sensors attached to the monitoring system. In a non-limiting example, a user could configure the system to place an order with on online retailer when indicated by condition-based trigger events. In this example, when the trigger event is detected a notification could be delivered to the display or mobile device associated with the monitoring system asking the user to confirm the purchase of the required consumable item. In a non-limiting example, a condition that triggers the delivery of such a notification may be "if the system detects a filter has reached XX % of is useful lifespan and the user has opted-in for automated reordering of consumables and the user has configured the system to interface with an online retailer then push an order approval request to the user," where XX is a number that may be pre-configured for the system. Additional notifications may be triggered by other conditions and business rules that are pre-configured within the monitoring system.

While certain illustrative embodiments have been described, it is evident that many alternatives, modifications, permutations and variations will become apparent to those skilled in the art in light of the foregoing description.

What is claimed is:
1. A system, comprising:
a head sensor apparatus and a tail sensor apparatus physically and separably connected to one another;
a plurality of sensors embedded within said head sensor apparatus and said tail sensor apparatus and in wireless communication with a processor;

the plurality of sensors configured to continuously monitor an ambient condition of air flow and air pressure as affected by a Heating, Ventilating, and Air Conditioning (HVAC) system;

said separable head sensor apparatus and tail sensor apparatus physically connected to said HVAC system, where said tail sensor apparatus is mounted such that the sensor end is inside a duct and said head sensor apparatus is mounted such that the sensor end is in a room side of an air filter grille of said HVAC system having physical attachment to the ductwork of said HVAC system;

sensor monitoring data collected by said plurality of sensors reported to the processor;

the processor configured to analyze the sensor monitoring data and compare the sensor monitoring data against pre-set measurement values, wherein the ambient condition to be monitored is the level and amount of particulate matter in air flowing through an air filter and where the amount of particulate matter in air flowing through an air filter is determinative of clogging of an air filter when the amount of particulate matter exceeds a pre-set measurement level; and sensor monitoring data values that exceed the pre-set measurement values are formatted and reported to a display device associated with a user.

2. The system of claim 1, further comprising the head sensor apparatus, tail sensor apparatus, and neck portions of the system configured to work together to gather and report sensor data to said processor.

3. The system of claim 1, where the sensors are comprised from the set of pressure sensors, temperature sensors, air quality sensors, light sensors, humidity sensors, capacitive proximity sensors, vibration sensors, and/or a microphone.

4. The system of claim 1, where at least one portion of the system is in physical contact with the HVAC system to be monitored.

5. The system of claim 1, where the display device associated with a user may be any of a network connected browser, a wireless mobile device, a wireless tablet, a network connected computer, and any device configured to communicate through near field communications.

6. The system of claim 1, further comprising performing a primary sensor measurement and a secondary sensor measurement, where the secondary sensor measurement is collected as a verification measurement.

7. The system of claim 1, where the sensor measurements create an accurate description of the usage duty-cycle and the efficiency of the HVAC being monitored.

8. The system of claim 7, where the description of the usage duty-cycle and the efficiency may be analyzed by the processor to report anomalies of operation that may be an indication of imminent HVAC system failure.

9. The system of claim 1, further comprising providing condition-based advertisements triggered by detected system conditions to one or more users and transmitting these advertisements to the one or more users.

10. The system of claim 1, further comprising automated ordering of consumable items when triggered by conditions detected through the sensors attached to the monitoring system.

11. The system of claim 1, where the tail sensor apparatus is in physical and data connection with said head sensor apparatus.

12. The system of claim 2, where said head sensor apparatus and said tail sensor apparatus are in physical contact with an air filter associated with said HVAC unit.

13. The system of claim 12, where at least one pressure sensor is exposed to upstream or ambient air pressure and at least one pressure sensor is exposed to downstream air pressure as air flows through said air filter.

* * * * *